United States Patent
Pelleter et al.

(10) Patent No.: US 6,694,769 B2
(45) Date of Patent: Feb. 24, 2004

(54) VENTILATION AND AIR HEATING TREATMENT INSTALLATION IN A BUILDING COMPRISING SEVERAL HOUSING UNITS

(75) Inventors: Xavier Pelleter, Toulouse (FR); Damien Labaume, Castanet Tolosan (FR)

(73) Assignee: Aldes Aeraulique (FR)

( * ) Notice: Subject to any disclaimer, the term of this patent is extended or adjusted under 35 U.S.C. 154(b) by 0 days.

(21) Appl. No.: 10/257,658

(22) PCT Filed: Apr. 23, 2001

(86) PCT No.: PCT/FR01/01242
§ 371 (c)(1),
(2), (4) Date: Feb. 19, 2003

(87) PCT Pub. No.: WO01/81833
PCT Pub. Date: Nov. 1, 2001

(65) Prior Publication Data
US 2003/0154737 A1 Aug. 21, 2003

(30) Foreign Application Priority Data
Apr. 25, 2000 (FR) .............................................. 00 05259

(51) Int. Cl.[7] .............................................. F25B 13/00
(52) U.S. Cl. ...................... 62/324.1; 62/428; 62/DIG. 1
(58) Field of Search ........................... 62/324.1, 324.6, 62/186, 428, DIG. 16; 165/207; 454/244

(56) References Cited

U.S. PATENT DOCUMENTS

| | | | | |
|---|---|---|---|---|
| 2,293,482 A | * | 8/1942 | Ambrose ..................... 62/159 |
| 2,737,787 A | * | 3/1956 | Kritzer ....................... 62/259.1 |
| 2,801,524 A | * | 8/1957 | Fifield .......................... 62/156 |
| 2,847,834 A | * | 8/1958 | Atchison ...................... 62/263 |
| 2,873,585 A | * | 2/1959 | Dodge ......................... 62/179 |
| 4,655,278 A | | 4/1987 | Seguin | |
| 5,271,242 A | * | 12/1993 | Addington ................... 62/285 |

FOREIGN PATENT DOCUMENTS

| | | |
|---|---|---|
| EP | 0 909 926 | 4/1999 |
| FR | 2 778 228 | 11/1999 |
| WO | WO 97 06390 | 2/1997 |

* cited by examiner

Primary Examiner—William E. Tapolcai
(74) Attorney, Agent, or Firm—Cantor Colburn LLP

(57) ABSTRACT

An installation for ventilation and heat treatment of air in a building including housing units having living and functional quarters is provided, the installation including an air blowing unit for blowing air taken from outside the building into the living quarters, an extraction unit for extracting air from the functional quarters, ducts communal to the building for conveying air to and extracting air from each housing unit, a blowing duct connected to each housing unit for conveying the blowing air, an extraction duct connected to each housing unit for conveying the extracting air, and an individual thermodynanic unit disposed on the housing unit at the connection of the blowing and extraction, where the blowing air and the extracting air passes over the thermodynamic unit, the thermodynamic unit including an evaporator disposed proximate the blowing flow and a condenser disposed proximate the extracting flow.

10 Claims, 2 Drawing Sheets

VENTILATION AND AIR HEATING TREATMENT INSTALLATION IN A BUILDING COMPRISING SEVERAL HOUSING UNITS

FIELD OF INVENTION

The subject of the present invention is an installation for ventilation in a building comprising several housing units. The term housing unit is to be understood in the broadest sense, and can refer just as easily to housing units for dwelling as to other premises, for example those for use as offices.

DESCRIPTION OF RELATED ART

To carry out air quality treatment, the most conventional solution consists in using single-flow controlled mechanical ventilation. A ventilation unit placed, for example, on the roof of the building, extracts air from the functional quarters, such as kitchens and bathrooms, of the various housing units, while the air is admitted to the living quarters of the various housing units via air inlets placed, for example, in the door or window frames. These air inlets may give rise to acoustic disturbances because they allow noise from the outside to pass and may lead to thermal discomfort in winter, in that they let cold air in. As there is no possibility of recuperating energy on the renewal of air, the ventilation is therefore a significant source of heat loss.

Another known solution relates to double-flow ventilating systems. In this case, there is a ventilation unit blowing air taken from outside the building into the living quarters (drawing rooms, bedrooms, etc.) of the various housing units, and a ventilation unit, having the same characteristics as the blowing unit, extracting the air from the functional quarters (kitchens, bathrooms, etc.) of the various housing units. Individual static air-air exchangers may be arranged at each housing unit or at the ventilation units to preheat the blown-in air using the extracted air. The thermal balance is therefore better than that of a single flow installation because energy is recuperated from the extracted air. Furthermore, the problems of acoustic disturbance are eliminated because there are no air inlets placing each room of the living quarters in communication with the outside.

Increasingly, the problem of year-round heat treatment of the air also arises.

A first solution consists in individual air conditioning systems each comprising an external unit and an internal unit operating with recirculation. Such a system, which is completely independent of the ventilation, is very demanding from the point of view of installing it, because it is necessary to provide an external unit and a refrigerant fluid network. Aside from the high cost of production, such an installation may also cause acoustic disturbances with a unit on the outside and a blower on the inside of the housing unit, and for the same reasons may prove to be visually unattractive.

Another solution consists in providing a communal external unit connected either to a communal cold battery placed on the blowing network or to individual units placed in the housing units and operating with recirculation. This solution, aside from its lack of flexibility, is not used nowadays in housing units intended for dwellings because it poses problems regarding regulations, the metering of energy per apartment, and losses in the pipes.

BRIEF SUMMARY OF INVENTION

The invention provides an installation for ventilation and heat treatment of air in a building comprising several housing units, which is of simple and modifiable structure.

To this end, the installation to which the invention relates, of the type comprising a double flow ventilation system with a ventilation unit blowing air taken from outside the building into the living quarters: drawing rooms, bedrooms, etc. of the various housing units, and a ventilation unit, having the same characteristics as the blowing unit, performing air extraction from the functional quarters: kitchens, bathrooms, etc. of the air blown into the functional quarters, the air being conveyed to and extracted from each housing unit via ducts communal to the building, is characterized in that it comprises, at the connection of each housing unit to a pair of ducts, these being, respectively, a blowing duct and an extraction duct, an individual thermodynamic unit dedicated to the housing unit in question and over which the ventilation airflow passes, the evaporator and the condenser of this unit being arranged one on the blowing flow and one on the extraction flow, respectively.

Advantageously, the thermodynamic unit is housed in a casing comprising at least two compartments each equipped with an air inlet and with an air outlet and respectively containing the evaporator and the condenser of the thermodynamic unit.

According to one implementation of this installation, the evaporator of the thermodynamic unit is arranged on the flow of air blown into the housing unit, and the condenser is arranged on the flow of air extracted from the housing unit.

The installation according to the invention therefore comprises communal ventilation units and individual thermodynamic subassemblies and pipes without blowers. The individual thermodynamic subassemblies are installed on the communal air loop, which provides communal double flow controlled mechanical ventilation for the building.

The installation according to the invention therefore makes it possible to manage overall air quality in each housing unit by providing the regulation air renewal flow rates and filtering the blown-in air. In addition to this air quality management, the installation allows personalized heat treatment by producing cold during the summer months, using the air conveyed by the communal ventilation. The air blown in is cooled by passing over the evaporator of the thermodynamic unit, and the heat energy is removed by the air extracted from the controlled mechanical ventilation. To improve the performance of the thermodynamic system, this installation comprises a bypass pipe between the compartments containing the evaporator and the condenser, allowing an additional flow of air that does not pass through the housing unit to pass over the condenser. That allows an increase in the thermodynamic power without adversely affecting the thermal balance of the housing unit in question.

In order not to disrupt the equilibrium of the ventilation column, mounted on the bypass pipe is a airflow passing over the evaporator, and which is moved into its closed position upon the switch to the position of maximum extraction flow rate from the kitchen.

According to an advantageous implementation of this installation, during the winter months, the condenser of the thermodynamic unit is arranged in the flow of air blown into the housing unit, and the evaporator is arranged in the flow of air extracted from the housing unit. The thermodynamic system recuperates the energy from the extracted air and uses it to heat the blown-in air. The damper on the bypass pipe is then in the closed position.

The bypass pipe may also contain a flow regulating module placed upstream or downstream of the damper. This module is intended for equalizing the flow rate in the various apartments when there is a high number of these.

Advantageously, the thermodynamic unit is of the reversible type, with the possibility of reversing the direction of refrigerant and of swapping the functions of the evaporator and of the condenser. This arrangement makes it possible, without modifying the path of the circulated air at the thermodynamic unit, to use the unit to preheat the air in the winter and to cool the air in the summer.

According to another feature of the invention, the thermodynamic unit is connected to an operating keypad and controlled by a thermostat arranged in the housing unit.

In the absence of another heating system, an optional additional heating device may be installed on the blowing side. For this, the vent openings for blowing air into the various rooms of the living quarters are equipped with an additional device for electrically heating the blown-in air, which can be operated by a temperature probe also connected to the thermodynamic unit. Depending on the requirements of the housing unit, this device may operate either only with the fresh air flow rate or with an additional air flow rate recirculated at the blowing vent aperture if the required power is too high.

Each room is therefore individually regulated at each blowing terminal. As this room-by-room regulation is connected to the thermodynamic system by the electronic management system, the overall settings can be optimized while at the same time avoiding the problems of conflicting operation between the thermodynamic system and the additional electric heating resistive elements.

The following various advantages relating to such an installation may be noted.

Air quality is guaranteed by the controlled mechanical ventilation system, with flow rates that meet the regulations and the possibility of filtering the blown-in air.

From the thermal point of view, comfort is obtained in the summer by cooling the air, by recuperation of energy from the extracted air, and in the winter by preheating the blown-in air, which leads to a saving on heating consumption. This involves individual regulation at each thermodynamic unit, with consumption metered individually and without needless thermal losses in the pipes passing through the communal parts of the building.

As far as the design of the installation is concerned, it should be noted that it is not absolutely essential for all the housing units to be equipped with a thermodynamic unit, it being possible for certain housing units to be equipped with such a unit and for other housing units to be equipped with a static exchanger, with the possibility, when desired, of replacing the static exchanger with a thermodynamic exchanger, in order to spread the investment cost, As far as operation is concerned, it must be kept in mind that each thermodynamic module is autonomous, requires no installation of a fluid network, has no unit external to the building, as is the case with known air conditioning devices, and has no internal blower, as is the case with known ventilation devices, because the airflow rate is guaranteed by the communal controlled mechanical ventilation system of the building.

BRIEF DESCRIPTIONS OF THE DRAWINGS

In any event, the invention will be clearly understood with the aid of the description which follows with reference to the appended diagrammatic drawing, which, by the way of non-limiting example, represents one form of embodiment of this installation:

Figure 1:
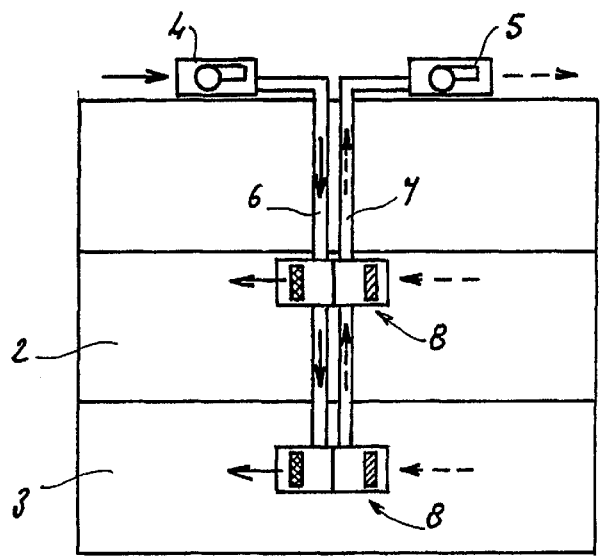
FIGS. 1 and 2 are two diagrammatic views of an installation in winter operation and summer operation, respectively.
Figure 2:
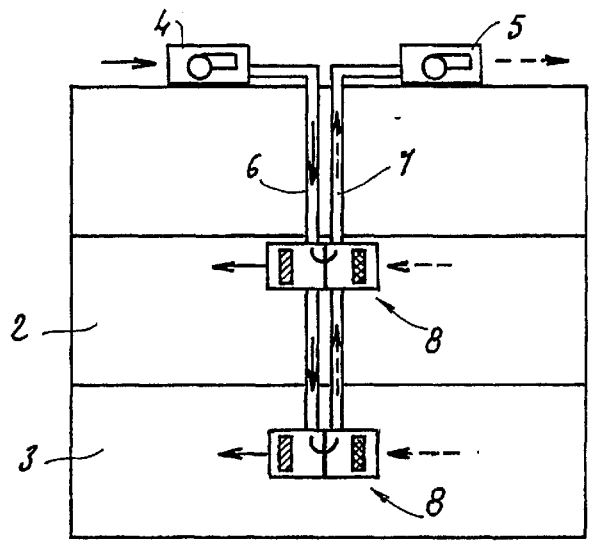

FIGS. 1 and 2 depict a building comprising two housing units 2 and 3. In the upper part of the building are arranged an air blowing unit 4 and an air extraction unit 5 engineered to suit the configurations of the network. The air blowing unit 4 sends air via a column 6 to the various housing units, while air is extracted from these via the unit 5 via a column 7. The blowing of air and the extraction at each housing unit is carried out by a casing containing a thermodynamic unit 8. The thermodynamic unit denoted by the general reference 8 comprises a casing divided into two compartments by a central partition 9, each compartment comprising an air inlet orifice and an air outlet orifice.

Figure 5:
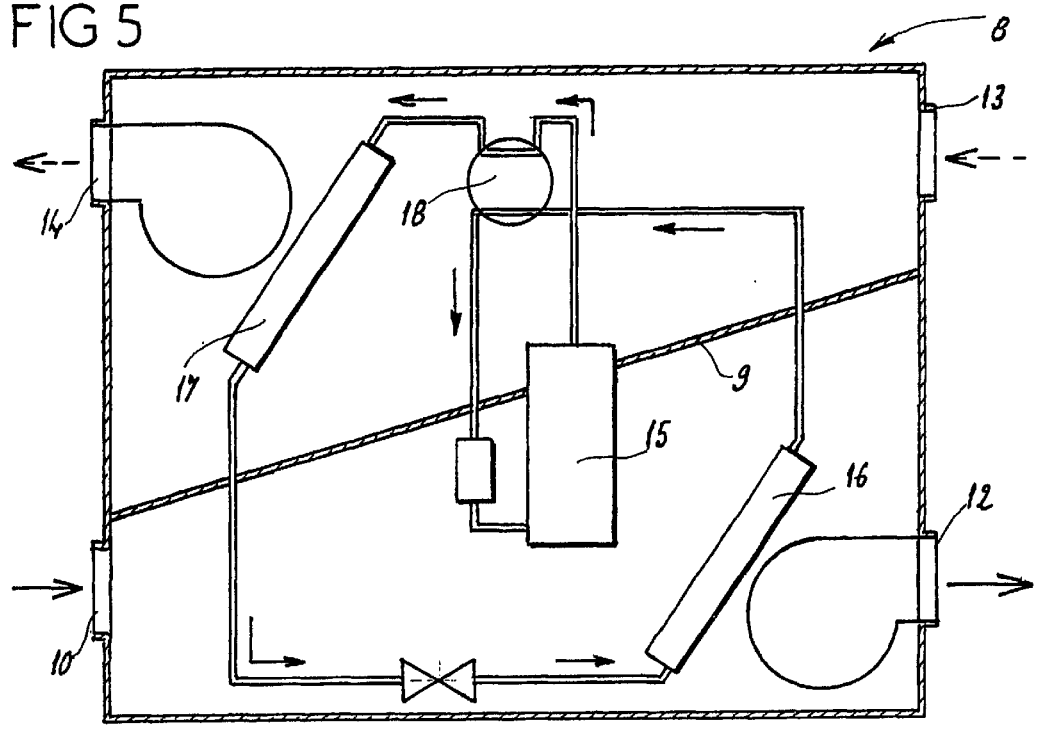
FIG. 5 is a view of a casing containing a thermodynamic module.

In FIG. 5, the fresh-air inlet orifice is denoted by the general reference 10, the fresh-air outlet orifice to the housing unit by the reference 12, the orifice for taking air back from the housing unit by the reference 13, and the orifice for discharging air to the outside by the reference 14. The thermodynamic unit comprises, in a way known per se, a compressor 15 and an evaporator 16 and a condenser 17, the evaporator 16 and the condenser 17 being housed in two separate compartments. It should be noted that arranged on the refrigerant circuit is a four-way valve 18, which allows the direction of flow of the fluid to be reversed. It is thus possible to swap the functions performed by the evaporator and the condenser, the evaporator becoming a condenser and vice versa, depending on the direction in which the fluid flows.

Figure 3:
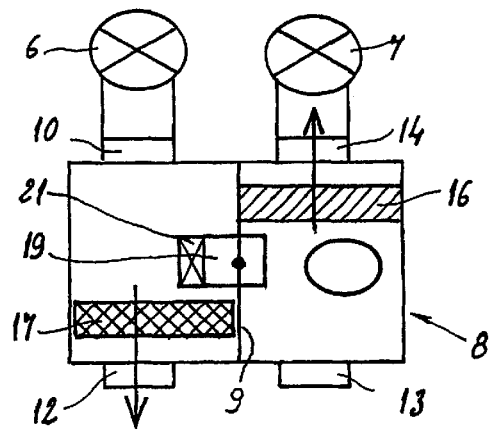
FIGS. 3 and 4 are two views of a thermodynamic module with which a housing unit is equipped, in the winter position and in the summer position, respectively.
Figure 4:
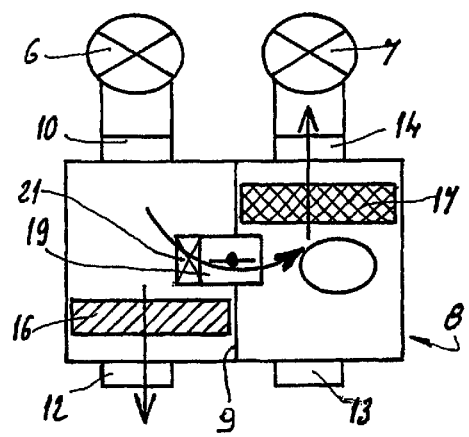

As shown in FIGS. 3 and 4, there is a bypass pipe between the two compartments of the casing containing the thermodynamic unit, this bypass pipe being equipped with a damper 19 allowing it to be closed. During the winter months, in order to preheat the air, with the damper 19 in the closed position, the four-way valve 18 mounted on the refrigerant circuit is switched in such a way that the element situated in the compartment for blowing air in toward the housing unit is the condenser, as shown in FIGS. 1 and 3.

By contrast, in the summer months, the valve 18 is switched so that the element forming the evaporator is in the air blowing part of the casing and the element forming the condenser is in the extraction part of the casing. The damper 19 is then in the open position as shown in FIG. 4 to allow some of the air, with a certain flow rate, to pass directly over the condenser in order to improve the performance of the thermodynamic unit.

It is possible to combine with the damper 19 a flow regulating module 21 which is intended to even out the flow rate in the various apartments when there is a high number of these.

Figure 6:
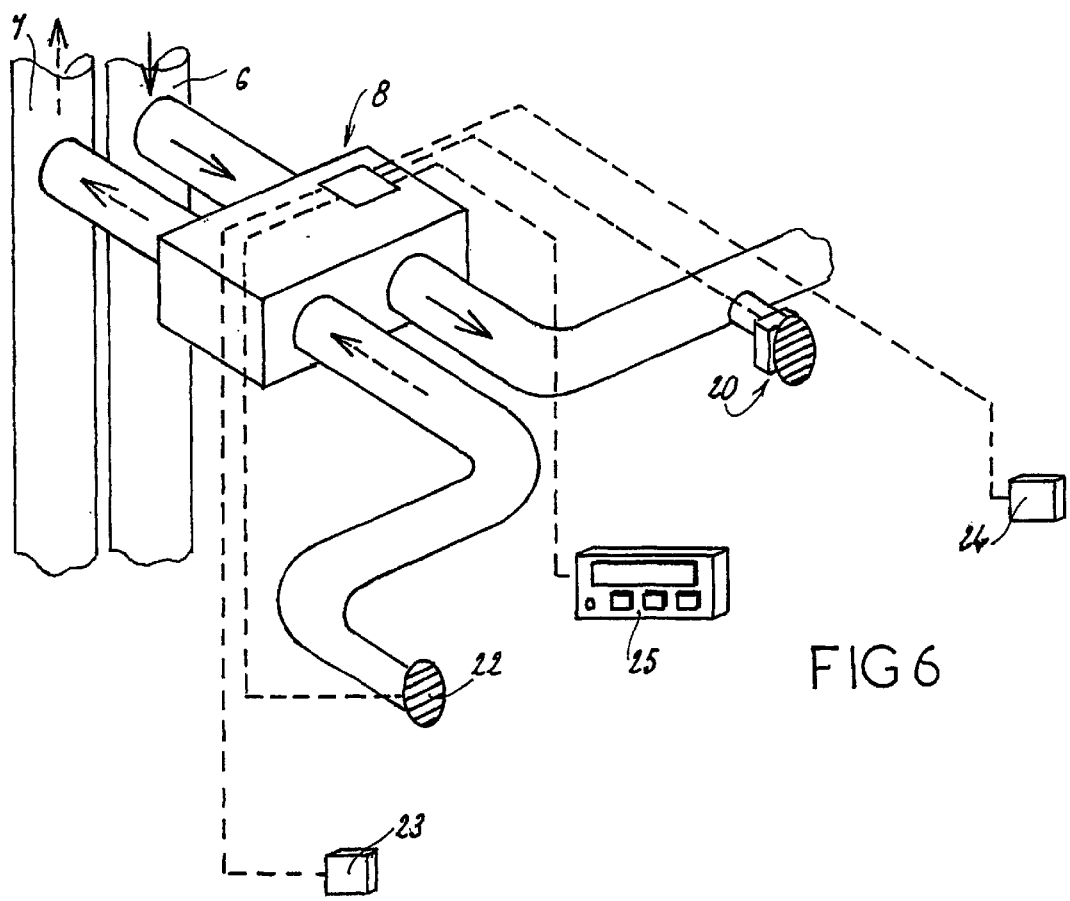
FIG. 6 is a very diagrammatic view of one method of regulating a thermodynamic module.

FIG. 6 very diagrammatically depicts the regulation and control of a thermodynamic unit. This figure depicts an air blowing vent aperture 20 which is equipped with a heating module, for example an electric heating module. An extraction vent in the kitchen is denoted by the reference 22. This figure also depicts a switch 23 for switching the flow rate in the kitchen from a normal ventilation value to a higher ventilation value, for example to allow a switch from 45 to 135 $m^3$ of air extracted per hour. There is also a temperature probe 24 per main room comprising a vent 20 and a master operating keypad with an internal temperature probe 25. It is possible to set the mode of operation of the thermodynamic unit to cooling or heating using the operating keypad. Furthermore, the associated temperature probe allows the operation of the thermodynamic unit to be switched on and off. The switch 23 makes it possible, when the unit is being used to cool the air, to close the damper 19 when the value of the flow rate extracted from the kitchen is increased, in order not to unbalance the ventilation column.

The temperature probe 24 connected to the thermodynamic module placed in a main room of the living quarters equipped with a vent with an additional heating system makes it possible to optimize regulation and to avoid problems of conflicting operation between the thermodynamic unit and the additional heating system.

As goes without saying, the invention is not restricted to the sole embodiment of this installation which has been described hereinabove by way of example; on the contrary, it encompasses all alternative forms thereof. Thus, in particular, one and the same housing unit may be equipped, depending on its size, with several thermodynamic units or, alternatively, the vents for distributing fresh air to the living quarters could have no additional heating system, without this in any way departing from the scope of the invention.

What is claimed is:

1. An installation for ventilation and heat treatment of air in a building including housing units having living and functional quarters, comprising:
   an air blowing unit for blowing air taken from outside the building into the living quarters;
   an extraction unit for extracting air from the functional quarters;
   ducts communal to the building for conveying air to and extracting air from each housing unit;
   a blowing duct connected to each housing unit for conveying the blown air;
   an extraction duct connected to each housing unit for conveying the extracted air; and
   an individual thermodynanic unit disposed on the housing unit at the connection of the blowing and extraction ducts;
   wherein the blown air and the extracted air pass over the thermodynamic unit, the thermodynamic unit including an evaporator disposed proximate the blown air flow and a condenser disposed proximate the extracted air flow.

2. The ventilation installation as claimed in claim 1, wherein the thermodynamic unit is housed in a casing comprising at least two compartments each equipped with an air inlet and an air outlet, the air inlet containing the evaporator and the air outlet containing the condenser.

3. The ventilation installation as claimed in claim 1, wherein the evaporator is arranged on the flow of air blown into the housing unit, and the condenser is arranged on the flow of air extracted from the housing unit.

4. The ventilation installation as claimed in claim 3, further comprising a bypass pipe between the compartments containing the evaporator and the condenser and allowing an additional flow of air that does not pass through the housing unit to pass over the condenser.

5. The ventilation installation as claimed in claim 4, wherein, mounted on the bypass pipe, is a damper which is placed in an open position when the thermodynamic unit is in operation with the blown air passing over the evaporator, and which is moved into a closed position upon a switch to a position of maximum extraction flow rate from the functional quarter.

6. The installation as claimed in either of claim 4, wherein the bypass pipe is equipped with a flow regulating module.

7. The ventilation installation as claimed in claim 1, wherein the condenser is arranged in the flow of air blown into the housing unit, and the evaporator is arranged in the flow of air extracted from the housing unit.

8. The ventilation installation as claimed in claim 3, wherein the thermodynamic unit is reversible, reversing a direction of a refrigerant and of swapping functions of the evaporator and of the condenser.

9. The ventilation installation as claimed in claim 1, wherein the thermodynamic unit is connected to an operating keypad and controlled by a thermostat arranged in the housing unit.

10. The ventilation installation as claimed in claim 1, further comprising vent openings for blowing air into various rooms of the living quarters, the vent openings being equipped with an additional device for electrically heating the blown-in air which can be operated by a temperature probe also connected to the thermodynamic unit.

* * * * *